April 25, 1939. G. MAHLCK 2,156,156
METHOD OF PRODUCING GROOVES OR CHANNELS IN DIELECTRIC MATERIALS
Filed July 15, 1935 3 Sheets-Sheet 1
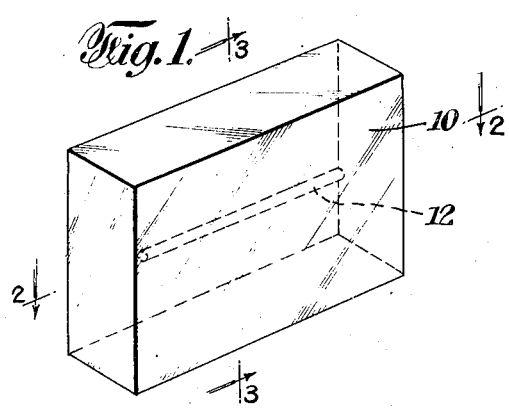
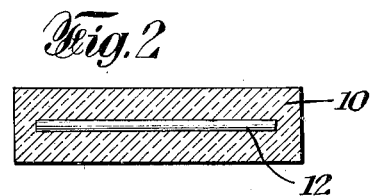
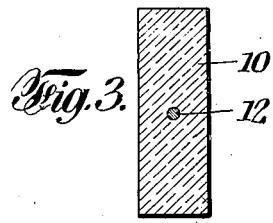
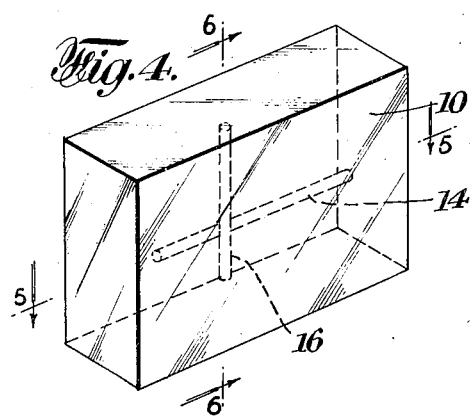
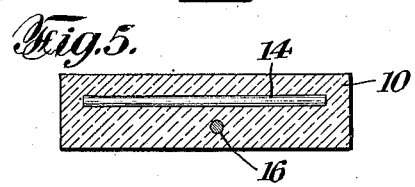
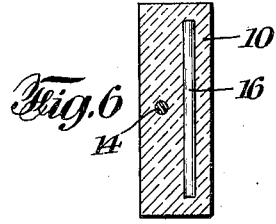
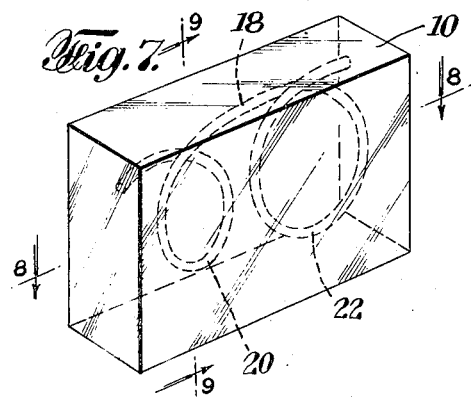
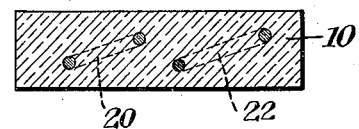
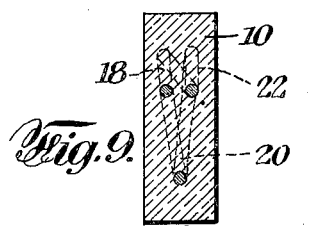
INVENTOR
Gustave Mahlck April 25, 1939.　　　　　G. MAHLCK　　　　　2,156,156
METHOD OF PRODUCING GROOVES OR CHANNELS IN DIELECTRIC MATERIALS
Filed July 15, 1935　　　3 Sheets-Sheet 2
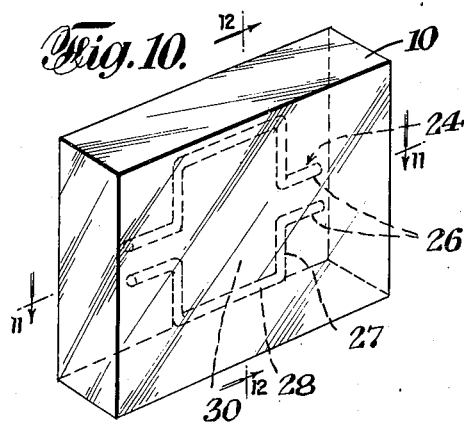
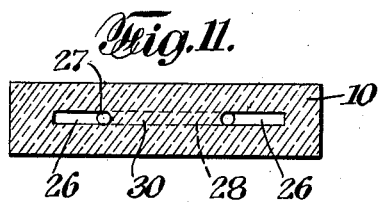
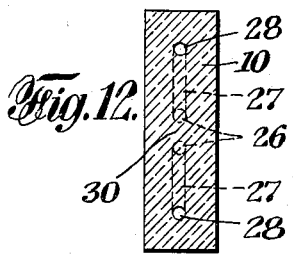
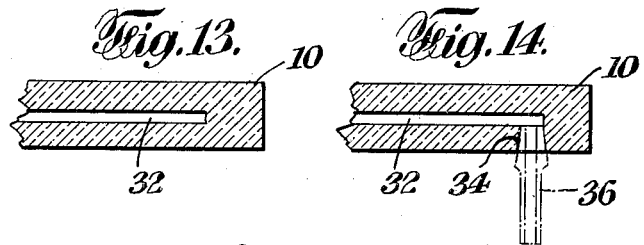
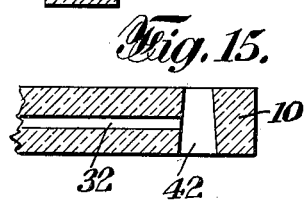
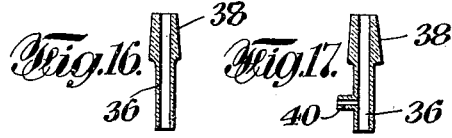
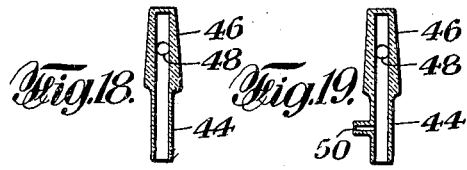
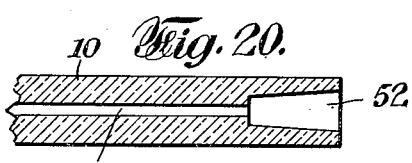
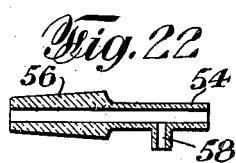
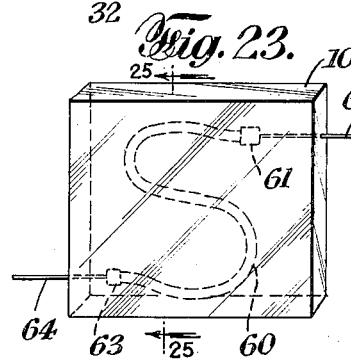
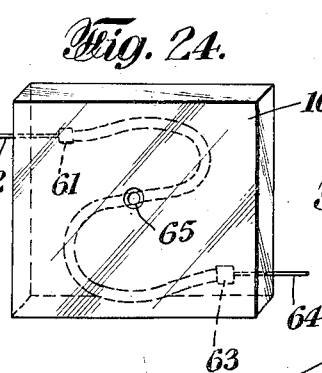
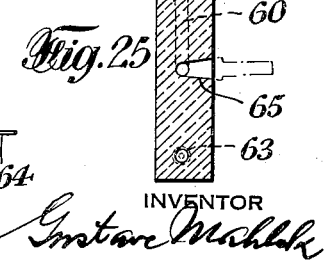
INVENTOR
Gustave Mahlck April 25, 1939.                G. MAHLCK                2,156,156
METHOD OF PRODUCING GROOVES OR CHANNELS IN DIELECTRIC MATERIALS
Filed July 15, 1935        3 Sheets-Sheet 3
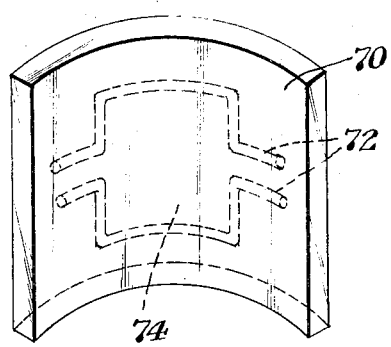
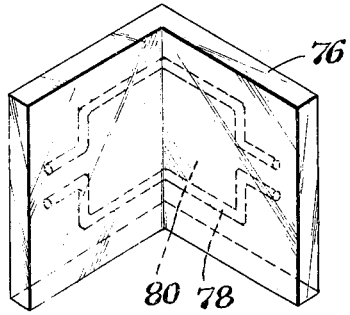
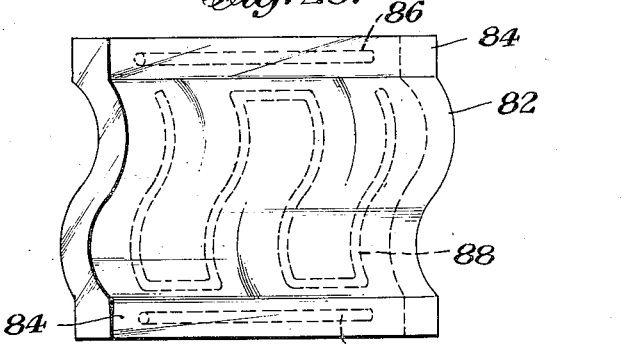
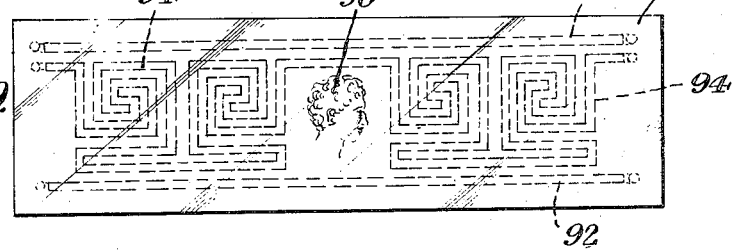
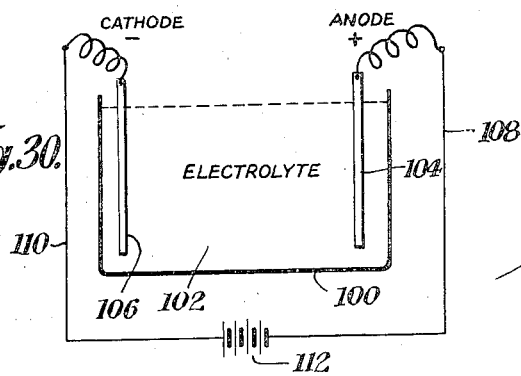

Patented Apr. 25, 1939

2,156,156

UNITED STATES PATENT OFFICE 2,156,156

METHOD OF PRODUCING GROOVES OR CHANNELS IN DIELECTRIC MATERIALS

Gustave Mahlck, East Orange, N. J.

Application July 15, 1935, Serial No. 31,430

4 Claims. (Cl. 204—1)

This invention relates primarily to vacuous electric devices such as are used in different systems of illuminating by luminescent areas and to a method of producing same, and to an electric conducting device for protective systems and a method of producing same.

It is understood that the invention is not limited to the particular application here illustrated but is applicable to the construction of devices for numerous other purposes such as, for instance, therapeutic apparatus, thermionic apparatus and scientific glassware and instruments, apparatus used in television or for decorative and advertising articles and devices, or as container or vehicle for holding liquids and fluids and gases or other materials of any description with or without being activated, oscillated or ionized by electric currents, and for holding fine or coarse metal or other powder, metal coatings or metal precipitations or metal foil as electric current conductors, and for holding any other material broken up into fine or coarse powder for any purpose whatsoever.

One object of the invention is to provide a strong flat article or element of vitreous, dielectric, transparent or transluscent material, which may be flat, sheet-like elements or may be curved to any degree of a circle or may be made angular shape at any degree of an angle, as may be desired, having one or more grooves or channels running through the entire body of the employed material for the purpose of being used as a container or vehicle.

It is a further object to provide a novel means of tubulating within a vitreous, dielectric, transparent or transluscent body or element of the general class described and to provide proper means of evacuating the same.

It is another object to provide a strong flat article or element which may also be curved at any degree or bent at any angle, of vitreous, dielectric, Bakelite-like or similar transparent or transluscent material having one or more passages therein which passages may cross over themselves or traverse a course such as to make them parallel or diagonal to themselves with slight clearances.

In the embodiment of the invention here shown an ionization conductor display is provided by glass or other materials mentioned before, with pathway or pathways for the discharge being provided therein, which is not laminated but is in fact one solid sheet or plate resembling heavy wireglass with the metal-wire omitted.

It is an object to provide a new method of production in a transparent or transluscent ionization conductor device in which the discharge starts at any desired point and stops at any desired point with or without any connection with the edges of the device.

It is an object to provide a new method or process of producing a device of the class described which may be made entirely of transparent or transluscent material, which will be of considerable strength, will be self-supporting and suitable as a complete electrical device with no additional elements necessary other than a mounting and a contact to supply the necessary current.

It is also an object to provide a method of manufacturing a transparent or transluscent article or element having a passage and or passages therethrough crossing over itself or themselves or running superposed over itself or themselves from a single solid sheet or plate of material.

It is a further object to provide an ionization conductor lamp in which the effect of striations and concentrated twisting discharge columns is completely overcome.

The invention provides a practical commercial means of manufacturing vacuum electric or extremely flat, yet hollow devices in quantity and at a relatively low cost, and makes possible the manufacture of devices with highly artistic additions, such as carved or pressed or frosted pictures and decorations, which applications were heretofore impossible with formerly applied methods.

The type of seal or vacum seal here provided is of such nature as to allow considerable choice in the particular method of evacuation; the seal itself being made by suitable means such as resinous materials of the type of Bakelite.

A further object is to provide an element having a plurality of separate channels or grooves for discharges, which may, if desired, be made to cross each other, or have different gaseous conductors therein, thereby providing for illumination from separate pathways of different colors within one single sheet or plate or element.

It is further within the contemplation of this invention that luminous gas of any suitable character may be employed, such as for example, neon, argon, krypton, xenon, helium, or the like, mercury vapor or the like or any desired mixture of different gaseous substances or just plain colored fluids or liquids or other materials, such as fine or coarse metal, or other powders, metal coatings, metal precipitations or metal foils, or combinations thereof, to suit and answer any desired purpose or effect.

It is an object of the invention to provide a flat, bent or curved container or vehicle of glass or other suitable plastic transparent or transluscent material with grooves or channels within, which latter may be coated with metallic precipitations, such as is done in the manufacture of mirrors, or which may be by any other means provided within with fine or coarse crystals or powder of any material, or with metal coatings or precipitations or metal foil or combinations thereof, either to be used for advertising or scientific or commercial purposes, or as a conductor of electric currents of any kind such as are now used for burglar alarms in protective devices for banks, stores and storage- and warehouses holding valuables of any description.

It is also an object of the invention to provide a process or method whereby within glass or other suitable plastic transparent or transluscent material, patterns or models or pictures or designs or letters of any combination and description, consisting of metal or any other suitable material, are temporarily imbedded for the purpose of forming within such glass or other above described material, the desired directions of the grooves or channels, the material of such patterns or models to be permanently removed after the glass or plastic material described above has cooled and solidified. In other words it is the purpose of this invention to provide a process or method for making designs or pictures or letters or anything wanted for decorative, instructive, commercial, scientific or advertising purposes not on the outside surface of the sheet or plate of glass or other above described material, but, on the contrary, directly within the glass or other above described material.

It is an object to provide a process or method whereby glass or other plastic material, either flat or curved or bent at any desired degree, is produced with grooves or channels within the material or glass itself, with an appearance similar to heavy wire-glass in which the metal wire has been removed.

It is another object of this invention not to make any grooves or channels by engraving one or more sheets or plates of glass or similar plastic material and pasting or fusing them together, but to apply an entirely new method and process and proceed as follows: Whatsoever shape or form of the desired grooves or channels are wanted are produced first on a copy or print by electrolytical process or so called electrolysis, the same process which is employed by electrotype manufacturers, and, to simplify matters in the description of this invention, one electrotype of the design of the grooves or channels is brought together with either a flat sheet of similar electrotype-metal, or a second of the same electrotype of the design of the grooves or channels is brought together with the first, the hollow side of the first face to face with the hollow side of the second, so forming a hollow body of the desired pattern or design of the grooves or channels. This pattern or design of metal of the grooves or channels is now placed within molten glass or whatever plastic material may have been used, in the same manner or similar technique as is applied in the manufacture of wire-glass and as is known to those skilled in the art. When cooled and/or solidified, there is within this solid sheet or plate the pattern or design of the grooves or channels of hollow metal. The backside or any desired or suitable side of the plate or sheet is now drilled at suitable place or places to lay bare the metal pattern or design for attack from the outside, and now the procedure is reversed. The whole sheet or plate is immersed in the electrolytic solution of the electrolytical bath or vat or battery, a conductor wire attached at a suitable place or places to the metallic groove- or channel-pattern or design to the anode, and the metal inside of the sheet or plate of glass or other suitable material will gradually disappear, dissolved and transported to the cathode, or vice versa, according to whatever metal or electrolytical chemical solution is employed, thus leaving a sheet or plate of glass or other suitable material, with the metal which was within removed by electrolysis, exactly as in the manufacture of the electrotype-like original. It is well known that countless electrotypes can be made from one original design, and that all electrotypes are alike. It becomes therefore evident that all sheets or plates of glass or any other suitable material made by this method must be alike, thus solving mass production.

It is an object of this invention to employ metal patterns or designs of channels or grooves of letters or figures or lines of any description which may be produced by electrolysis or may be of pressed or expanded metal, solid or hollow, placed within the glass or other suitable plastic material, and after the latter is pressed and rolled into the desired form of plates or sheets which may be flat or curved or bent to any desired degree, and cooled and/or solidified, the element, as we may call it, is drilled at suitable place or places to permit the metal to be removed by electrolysis or any other chemical means, such as alkalies or salt solutions, or mixtures thereof, or acids or acid solutions or mixtures thereof, able and active in attacking and dissolving and removing the core made of metal or any other suitable material, with or without the action or use of electric currents. All other details are known to anyone skilled and the arts; the technique of the manufacture of the element being the same as that of manufacturing wire-glass.

It is another object of this invention to have the designs or patterns of the designs, whatever they may be, but especially those which are intended to appear as a repetition of straight or bent or waving lines, made of hollow metal, such as metal tubing, or of solid metal wire, and have these metallic patterns of the designs placed in the glass or whatever other suitable plastic material is used, to be cast and/or pressed or rolled, as the case may be, and after cooling and/or solidifying being drilled at suitable place or places to remove the metal by electrolysis or any other suitable chemical means, with the result of having a plate or sheet of glass or other suitable plastic material with hollow grooves or channels within, which were before taken up by the metallic patterns of the designs of the desired grooves or channels. It is evident that wire or tube bent like a pigtail will leave grooves or channels like that of a pigtail, and these grooves or channels may cross each other at any angle or diagonally, as the case may be, but will have sufficient material between them where the lines cross, so that the electric current of the discharge cannot jump but is forced to follow the groove or channel of the metallic pigtail pattern design of metal which was electrolytically or by any other suitable chemical means removed.

It is another object of this invention, when making the desired grooves or channels in the glass or other suitable plastic material, by using either solid metal wire, hollow metal such as metal tubing, die stamped, pressed, extruded or expanded metal patterns or designs, or by electrolytical process from wax or other suitable model, to supply the ends or terminals of these metallic patterns of the groove or channel designs with the necessary electrodes and conductor wires, which are intended to activate, or oscillate or ionize the rare gases like neon or the metal vapors like mercury vapors or mixtures thereof, before the metallic pattern or patterns of the groove or channel designs are placed within the glass; these electrodes and conductor wires are preferably made of such metal which will not so easily dissolve or disappear from one electric pole or terminal to the opposite pole or terminal, as the case may be, in the electrolytical bath or vat or battery, so that the electrolytical or chemical metal dissolving process may be terminated when the metal of the pattern of the groove or channel design has disappeared but before the electrodes for the activation, or oscillation or ionization of the rare gases or metal vapors or mixtures thereof are attacked. This method of placing the electrodes with conductor-wires, which are intended to serve for the above mentioned purposes, at the ends or terminals of the metallic pattern of the groove or channel designs, provides also a desirable connection for the electric current necessary in the electrolytical process for the removing of their metal, thereby requiring the plate or sheet or element only to be drilled at one suitable place for the electrolytical or chemical metal dissolving action to proceed. It is needless to say that all openings made by drilling for the escape of the electrolytically traveling or chemically dissolved metal, or the openings for supplying the electric current, shall be closed with plugs of glass or any other suitable material, and shall, if necessary, be provided with an evacuating duct, and shall be forced into the drilled holes with cement of dielectric material.

In the drawings, which are merely illustrative of the presently preferred embodiment of the invention, Fig. 1 is a plan view of the device in form of a solid piece of glass 10 containing imbedded within one piece of metal tubing or metal wire 12;

Fig. 2 is a section of Fig. 1 through 2—2, in which 10 is the solid piece of glass, showing within the imbedded one piece of metal tubing or metal wire 12;

Fig. 3 is a section of Fig. 1 through 3—3, in which 10 is the solid piece of glass, showing in another view the location of the within imbedded one piece of metal tubing or metal wire 12;

Fig. 4 is a plan view of the device in form of a solid piece of glass 10, containing imbedded within two pieces of metal tubing or metal wire 14 and 16;

Fig. 5 is a section of Fig. 4 through 5—5, in which 10 is the solid piece of glass and showing within imbedded the same two pieces of metal tubing or metal wire 14 and 16 not contacting with each other;

Fig. 6 is a section of Fig. 4 through 6—6, in which 10 is the solid piece of glass, and showing the within imbedded two pieces of metal tubing or metal wire 14 and 16 not contacting with each other;

Fig. 7 is a plan view of the device in form of a solid piece of glass 10, containing imbedded within one piece of metal tubing or metal wire in the form of a pigtail or of two connected loops in which 18 is the connector and 20 and 22 are the loops;

Fig. 8 is a section of Fig. 7 through 8—8, in which 10 is the solid piece of glass, and showing the within imbedded metallic parts of the pigtail or two connected loops, and showing also that no parts of the loops of 20 and 22 make at any point contact with each other;

Fig. 9 is a section of Fig. 7 through 9—9, in which 10 is the solid piece of glass, and showing how the metallic tube or wire of the pigtail or of the two connected loops 20 and 22 by-pass to connector 18 without contact;

Fig. 10 is a plan view of the device in form of a solid piece of glass 10 containing imbedded within two pieces of metal tubing or wire 24, showing the possible plurality on the same elevation, and showing also that by bending them like U-shapes in which the openings face each other, 24, 26, 27, 28, fields can be created suitable for artistic decorations inside or on the outside surface, such as pressed, carved or frosted glass designs and pictures;

Fig. 11 is a section of Fig. 10 through 11—11, in which 10 is a solid piece of glass, showing how the bent pieces of metallic tubing or wire 26, 27, 28, and corresponding parts are imbedded in the same elevation within, and how fields of the illustrated type or similar fields can be created for artistic additions;

Fig. 12 is a section of Fig. 10 taken at 12—12;

Fig. 13 is a plan view of the device showing a section of a solid piece of glass 10 at the point where the groove or channel, which was created by the removal of the imbedded metal tubing or metal wire 32, ended or terminated;

Fig. 14 is the same plan view as Fig. 13, in which 10 is the solid piece of glass, with 32 representing the groove or channel created by the removal of the imbedded metal tubing or metal wire, but showing the location where the piece of glass may be suitably drilled 34 from its outer surface down to the metallic core of the tubing or wire to lay bare for attack the metal of the same; in which 36 illustrates how these drilled holes can be closed to suit any desired purpose by suitable plugs which may be cemented in with any suitable binder;

Fig. 15 is the same plan view as Fig. 13; 10 is the solid piece of glass with 32 representing the groove or channel made by the removal of the imbedded metallic tubing or wire, but showing another method 42 of how the piece of glass may be drilled to expose the metallic core of the tubing or wire for attack from the outside;

Fig. 16 represents a tubular 36 plug 38 recommended for closing the drilled holes as described in Fig. 14;

Fig. 17 represents a similar tubular 36 plug 38 provided with a duct suitable for evacuation purposes;

Fig. 18 and Fig. 19 represent tubular 44 plugs 46 in which the smaller end is closed and one side provided with a side-opening 48 leading to and connecting with, when inserted into the drilled hole 42 of Fig. 15, the groove or channel made by the removal of the metal core of the tubing or wire; Fig. 19 varies only in one respect from Fig. 18, as it is provided also with a suitable duct for evacuating purposes 50;

Fig. 20 is a plan view of the device showing a section of a solid piece of glass 10 at the point where the removed metal tubing or wire 32 was imbedded and now terminates the created groove or channel, showing another method how and where to drill to get an approach to the metal core for removal of the same and for suitable insertions of plugs or other means for either closing it entirely or for connections with conductors or similar electrical equipment;

Fig. 21 and Fig. 22 represent tubular 54 plugs 56, either to be inserted into the drilled hole 52 of Fig. 20, the tubular end of the plug in Fig. 22 suitably provided with 58 an evacuating duct;

Fig. 23 is a plan view of the device showing a metallic core 60 in the form of the letter S imbedded within a solid piece of glass 10, and where 61 and 63 represent the electrodes attached to the metallic core 60, showing the conductor-wires 62 and 64 connected to them leading to the outside to the source of the electric current;

Fig. 24 is a plan view of the reverse side of the in Fig. 23 illustrated solid piece of glass 10, rotated through 180° in the plane of the drawing to illustrate the in this case preferred and most suitable place for drilling a hole 65 to get an approach to the metal core for removal of the same, 61 and 63 representing the electrodes and 62 and 64 the conductor wires;

Fig. 25 is a section of Fig. 23 through 25—25, in which 10 is the solid piece of glass showing the location of the metallic core 60 and one electrode 63 located at the lower terminal of the metallic letter S, showing also the most suitable place for drilling a hole 65 with an indication how it may be closed for different purposes with a suitable plug;

Fig. 26 is a plan view of the device showing practically the same arrangement as in Fig. 10 with the only difference that it shows a curved device 70 with two similar U-shaped grooves or channels leaving a curved field for the creation of suitable artistic decorations either within at the time when produced or on the outside surface, such as pressed or carved or frosted designs or pictures;

Fig. 27 is a plan view of the device showing practically the same arrangement as in Fig. 10 and Fig. 26 with the only difference that it shows a bend at an angle device 76 with two similar U-shaped grooves or channels leaving an angular field for the creation of suitable artistic decorations either within at the time when produced or afterwards on the outside surface, such as pressed or carved or frosted designs or pictures;

Fig. 28 is a plan view of the device showing a solid piece of glass partly flat 84, partly at an angle and partly curved 82, with the straight grooves or channels in the flat parts 86, and the curved and tortuous grooves or channels 88 in the curved part; Fig. 28 is only one example of the various applications this invention is making possible;

Fig. 29 is a plan view of the device, in which 90 represents a solid piece of glass, 92 and 92 two straight grooves or channels, 94 one tortuous groove or channel leaving in 96 a field for decorations such as can be made within at the time when produced or afterwards by sand carving, or pressed glass or frosted glass or by any other means;

Fig. 29 illustrates also convincingly how by the use of, for instance, meander-like grooves or channels very artistic and beautiful devices may be created;

Fig. 29 illustrates also that it is possible to create beautiful light effects by employing various gases or vapors etc. which give different colored light within one and the same device. These same effects are also possible with the device illustrated in Fig. 28;

Fig. 30 illustrates an electrolytical bath or vat or battery, in which 100 is the vat or tank, 102 the chemical or electrolytical solution, 104 the anode or positive pole or terminal, and 106 the cathode or negative pole or terminal, 108 and 110 the conductor wires connecting the anode and the cathode with the source of the electric current 112.

Having thus described my invention with particularity with reference to the preferred process of carrying out the same, and in connection with the present preferred product resulting thereof, it will be obvious to those skilled in the art, after understanding my invention, that other changes and modifications may be made therein without departing from the spirit and scope of my invention, and I claim in the appended claims to cover such changes and modifications as are within the scope of the invention.

Having thus described my invention, although without attempting to set forth all of the forms which it might take, or all of the applications in the various arts and industries to which it might be put,

What I claim as new and desire to secure by Letters Patent of the United States is:

1. The method of forming within a dielectric body a space free from the material of the body which consists in first forming the body with a structure formed of metal completely imbedded and enclosed therein corresponding to the free space to be formed and applying a suitable difference of electric potential to one point of the structure and an electrolytic solution in which the body is immersed to remove said structure.

2. The method of forming within a body a space free from the material of the body which consists in first forming the body with a structure formed of metal completely imbedded and enclosed therein then piercing the body to enable electrical connection to be made to the structure and applying a suitable electric potential to one point of the structure and an electrolytic solution in which the body is immersed to remove said structure.

3. The method of forming within a body a space free from the material of the body which consists in first forming the body with a structure formed of metal completely imbedded and enclosed therein, with all parts beneath the exterior surface of the body, corresponding to the free space to be formed and having an electrode accessible from the surface of the body and imbedded in the body so as to make electrical contact with the structure, then piercing the surface of the body to enable electrical contact to be made with said structure, applying a suitable electric potential to said structure and an electrolytic solution in which the body is immersed to thereby remove said structure, said electrode being of a material to remain substantially unaffected by said electrolytic solution.

4. The method of forming within a body a space free from the material of the body as set forth in claim 3 and plugging the pierced surface.

GUSTAVE MAHLCK.